(12) United States Patent
Jabara

(10) Patent No.: US 11,430,075 B2
(45) Date of Patent: Aug. 30, 2022

(54) SYSTEM AND METHOD FOR PAYMENT TRACKING OF PURCHASES

(71) Applicant: Chihuahua Brewing Company, LLC, Newport Beach, CA (US)

(72) Inventor: Gary Bernard Jabara, Newport Beach, CA (US)

(73) Assignee: Chihuahua Brewing Company, LLC, Newport Beach, CA (US)

( * ) Notice: Subject to any disclaimer, the term of this patent is extended or adjusted under 35 U.S.C. 154(b) by 73 days.

(21) Appl. No.: 16/656,467

(22) Filed: Oct. 17, 2019

(65) Prior Publication Data

US 2020/0126171 A1    Apr. 23, 2020

Related U.S. Application Data

(60) Provisional application No. 62/748,329, filed on Oct. 19, 2018.

(51) Int. Cl.
| | |
|---|---|
| *G06Q 50/12* | (2012.01) |
| *H04W 4/80* | (2018.01) |
| *G06Q 20/18* | (2012.01) |
| *G06Q 20/28* | (2012.01) |
| *G06Q 20/32* | (2012.01) |
| *G06Q 30/06* | (2012.01) |
| *H04W 84/18* | (2009.01) |
| *H04W 88/02* | (2009.01) |

(52) U.S. Cl.
CPC ............ *G06Q 50/12* (2013.01); *G06Q 20/18* (2013.01); *G06Q 20/28* (2013.01); *G06Q 20/3224* (2013.01); *G06Q 20/3278* (2013.01); *G06Q 30/0607* (2013.01); *H04W 4/80* (2018.02); *H04W 84/18* (2013.01); *H04W 88/02* (2013.01)

(58) Field of Classification Search
CPC ............................... G06Q 50/12; G06Q 20/18
USPC ......................................................... 705/15
See application file for complete search history.

(56) References Cited

U.S. PATENT DOCUMENTS

| | | | | |
|---|---|---|---|---|
| 8,880,427 | B1 * | 11/2014 | Jones ................. | G06Q 30/0635 705/22 |
| 9,471,915 | B2 * | 10/2016 | Fuerstenberg ......... | G06Q 20/40 |
| 2010/0125362 | A1 * | 5/2010 | Canora ..................... | G07F 9/00 700/236 |

(Continued)

*Primary Examiner* — Luna Champagne
(74) *Attorney, Agent, or Firm* — Davis Wright Tremaine LLP; Michael J. Donohue

(57) ABSTRACT

A beverage dispensing system employs a user-wearable device that contains identification data. The user is associated with the wearable device using the identification data and provides an initial purchase credit also stored in association with the wearable device. To make a purchase, the user positions the wearable device in proximity with a sensor co-located with a beverage dispenser. The sensor receives the identification data and provides it to a payment processor. The processor determines if the purchase request is less than the stored purchase credit and, if so, activates an actuator positioned between a beverage storage container and a beverage dispenser outlet to thereby dispense the beverage. The processor deducts the purchase amount from the available credit and stores the new credit value. The wearable device may communicate wirelessly with the sensor. The processor may be part of the beverage dispenser or remotely located and communicate via a network.

27 Claims, 5 Drawing Sheets

(56) References Cited

U.S. PATENT DOCUMENTS

| | | | |
|---|---|---|---|
| 2010/0187298 A1* | 7/2010 | Phillips | G06Q 20/3278 235/375 |
| 2018/0029859 A1* | 2/2018 | Hevia | B67D 1/0877 |
| 2020/0013038 A1* | 1/2020 | Kurata | G06Q 20/2295 |

* cited by examiner

SYSTEM AND METHOD FOR PAYMENT TRACKING OF PURCHASES

BACKGROUND OF THE INVENTION

Field of the Invention

The present disclosure is related generally to purchases of goods and, more particularly, to a system and method for payment tracking of such purchases.

Description of the Related Art

In some situations, such as a bar setting, alcohol purchases require going to the bar, waiting in line, and placing you order with the bartender. When the bartender returns with the order, you then have to pay the bartender and wait for your change or completion of a credit card transaction. In a crowded bar, this can be a very time-consuming process. Therefore, it can be appreciated that there is a significant need for s system and method to track purchases and automate the purchasing process. The present disclosure provides this, and other advantages, as will be apparent from the following details description and accompanying figures.

DETAILED DESCRIPTION OF THE INVENTION

Figure 1:
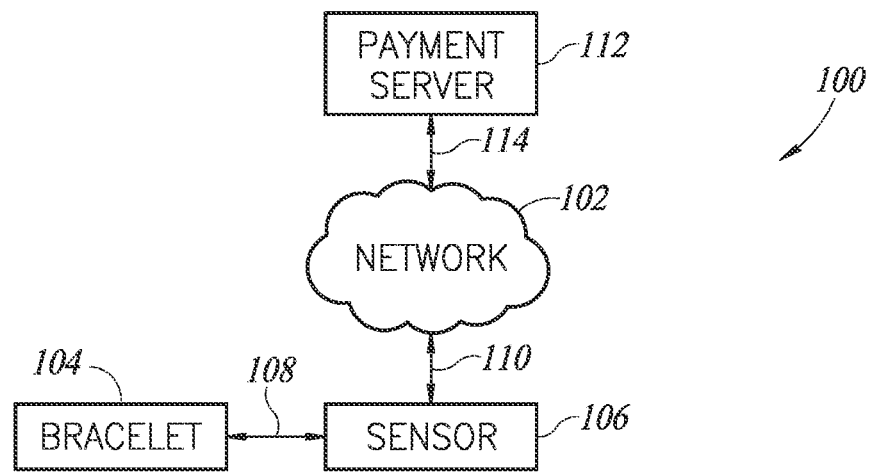
FIG. 1 illustrates a network diagram constructed in accordance with the present disclosure.

The present disclosure is directed to techniques for automatically tracking food and beverage purchases. In some implementations, dispensing of alcoholic drinks is automatically controlled. FIG. 1 illustrates a network diagram constructed in accordance with the present disclosure. In FIG. 1, a system 100 includes a network 102. The network 102 can be a local area network (LAN) for a self-contained implementation implemented with the bar itself or a wide area network (WAN) for a distributed network implementation.

A consumer user is provided with a wearable device, such as a bracelet 104 that contains electronic circuitry described in detail below. In general, the electronic circuitry contains communication circuitry that permits the bracelet 104 to communicate with a sensor 106 via a communication link 108. In one embodiment, the sensor 106 is located in proximity to an alcohol dispenser 130 (see FIG. 3), such as a beer tap. In a typical implementation, a business may have multiple sensors 106 positioned at various beverage distribution points. In addition, there may be a sensor 106 at a single location near the entrance or at a point of sale terminal to establish initial identification and credit data associated with the bracelet 104. This process will be described in greater detail below.

Figure 6:
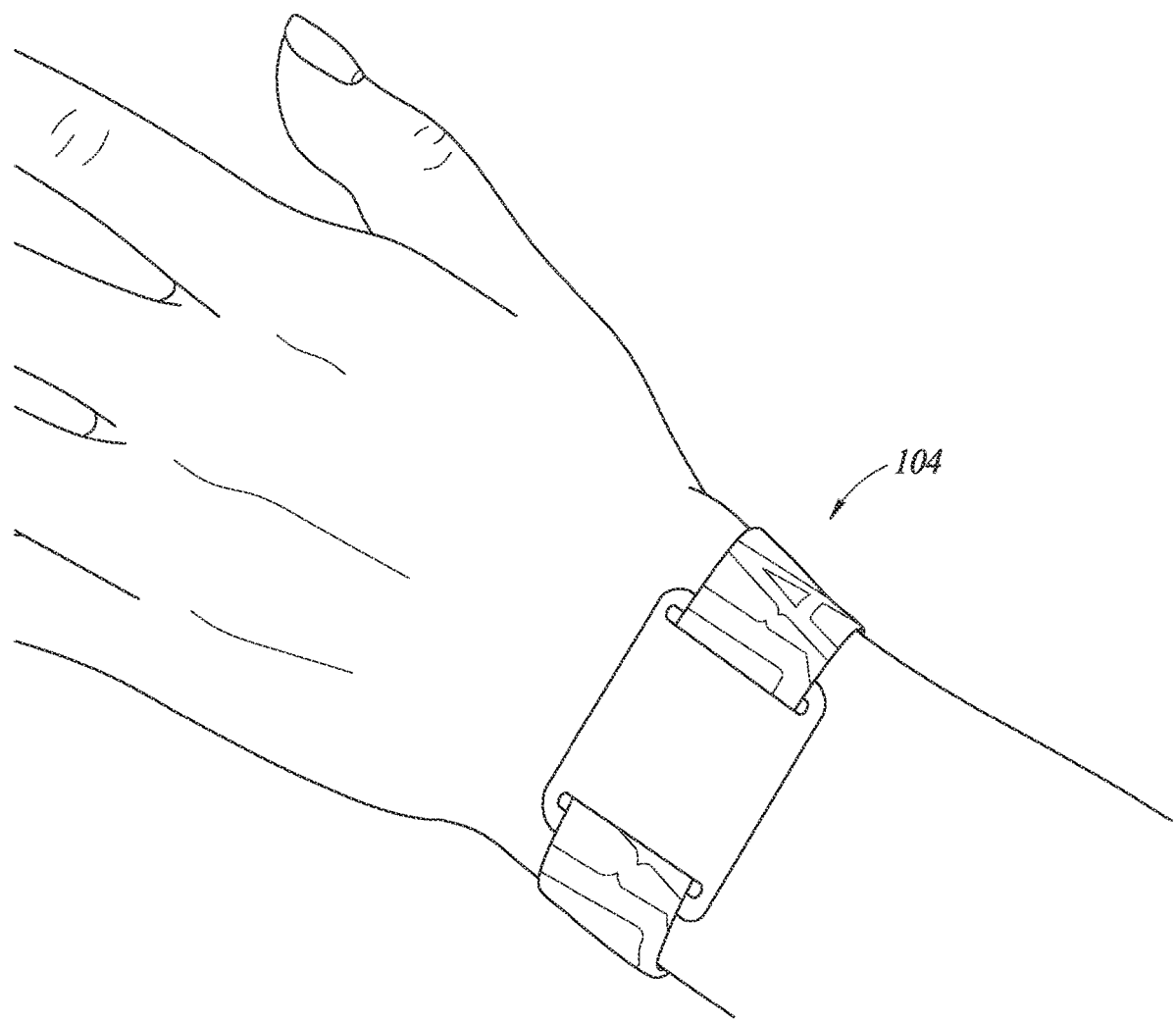
FIG. 6 illustrates one embodiment of a user wearable device, such as a bracelet.

The identification data need not be specific to the user. For example, the user can purchase credits upon entry to the bar or other drinking establishment. Any bracelet 104 can be selected from a bin and scanned by the sensor 106. FIG. 6 illustrates one embodiment of the bracelet 104. In this embodiment, the bracelet 104 is removably attached to the user wrist with a strap. This approach allows the bracelet to be reused multiple times. In another embodiment, the bracelet 104 may be attached to the user wrist in a manner that does not permit removal without destruction of the bracelet. This approach prevents one user from handing off the bracelet 104 to another user. For example, an individual may have exceeded their safe drink limit. The user cannot give their bracelet 104 to a friend to permit the friend to obtain another drink for that individual.

In operation, the user holds the bracelet 104 next to the sensor 106 to initiate a transaction. The sensor 106 detects the bracelet 104 and identifies the bracelet. The sensor 106 communicates with a payment server 112 via the network to determine the amount of credit remaining on the bracelet 104. The "credits" may be in the form of the number of drinks available if all drinks are the same price. For example, the payment server 112 may determine that three drinks remain available. Alternatively, the credits may be in terms of actual monetary credits, such as dollars, if the drinks vary in price. For example, the payment server 112 may determine that $13.97 in credits remain available. If sufficient credit is available, the payment server 112 authorizes delivery of a drink. In one embodiment, this may permit the user to draw a beer from the tap. Alternatively, it may notify the bartender that the user wishes a mixed drink or other beverage not available in a self-service format.

In one embodiment, the bracelet 104 contains circuitry for identification and communication. The communication circuitry uses a communication link 108 to communicate with the sensor 106. The communication link 108 may be in the form of near-field communication (NFC), Bluetooth, Zigbee, or other short-range communication formats. The NFC implementation may advantageously eliminate the need for an internal power supply because it derives power from inductive coupling with the sensor 106. The NFC implementation of the bracelet 104 can respond to a "ping" query from the sensor 106 with identification data. In this embodiment, the bracelet 104 need only provide bracelet identification information in response to the query from the sensor 106. The credit data is stored on the payment server 112 and need not be stored in the bracelet 104. The credit value paid for by the user can then be associated with the predetermined identification data inside the bracelet 104. The bracelet identification data and the credit value are stored in association with each other within the payment server 112.

Other NFC embodiments may include circuitry that is powered by the inductive coupling with the sensor 106. In this embodiment, both the identification information and credit data is stored in the bracelet 104.

In one embodiment, it is possible to program the bracelet 104 itself with the value of credits purchased by the user. In operation, every time to user purchases alcohol, the credit value in the bracelet 104 is updated to reflect the new purchase. This embodiment can eliminate the need for the network 102 and payment server 112.

The network 102 and sensor 106 are coupled together by a communication link 110. The communication link 110 may be implemented as part of a network access communication circuit, such as a modem or modem/router. The communication link 100 may further be implemented as a wireless communication link to avoid the limitations associated with physical connections between the sensor 106 and network 102. For example, the sensor 102 may include a WiFi or other short-range communication interface with the network 102 to establish the communication link 110.

Similarly, the network 102 and payment server 112 are coupled together by a communication link 114. The communication link 114 may be implemented as part of a network access communication circuit, such as a modem or modem/router. The communication link 100 may further be implemented as a wireless communication link to avoid the limitations associated with physical connections between the payment server 112 and network 102. For example, the payment server 112 may include a WiFi or other short-range communication interface with the network 102 to establish the communication link 114.

Figure 2:
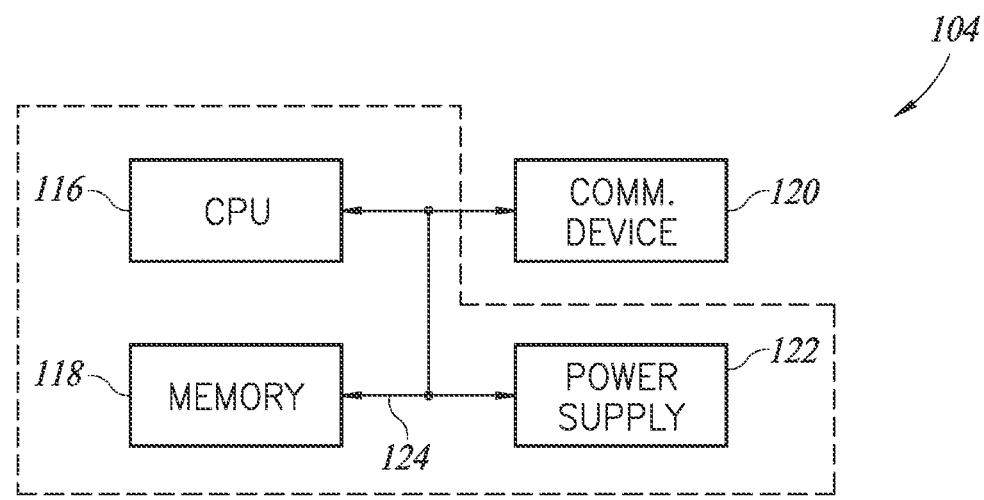
FIG. 2 is a functional block diagram of a user wearable device constructed in accordance with the present disclosure.

FIG. 2 is a functional block diagram of the bracelet 104. In its simplest NFC format, the bracelet 104 only includes a communications module 120. In this embodiment, the communications module 120 responds to a ping query by the sensor 106 contained in the dispenser 130 (see FIG. 3) by transmitting its stored identification data.

In other embodiments, the bracelet 104 may contain additional internal components, such as a central processing unit (CPU) 116 and a memory 118. In general, the CPU 116 executes instructions using data and instructions stored in the memory 118. The CPU 116 may be implemented as a conventional processor, microcontroller, application specific integrated circuit (ASIC), or the like. Similarly, the memory 118 may include random access memory, read-only memory, flash memory, and the like. Those skilled in the art will appreciate that the CPU 116 and memory 118 may be integrated into a single device. The bracelet 104 is not limited by the specific hardware used to implement the CPU 116 and memory 118. An NFC implementation of the bracelet 104, including the CPU 116 and memory 118, may also be able to derive power from the ping query and thus require no external power.

As discussed above, the communication device 120 may be in the form of NFC, Bluetooth, Zigbee, or other short-range communication formats. Depending on the type of communication device 120, power may be required. For example Bluetooth and Zigbee require power even though they are low-power devices. Thus, FIG. 2 uses dashed lines to illustrate the CPU 116, memory 118, and power source 122 as optional components.

The various components in the bracelet 104 are coupled together via a bus system 124. The bus system 124 may include an address bus, data bus, control bus, power bus, and the like. However, these various buses are illustrated FIG. 2 as the bus system 124.

Figure 3:
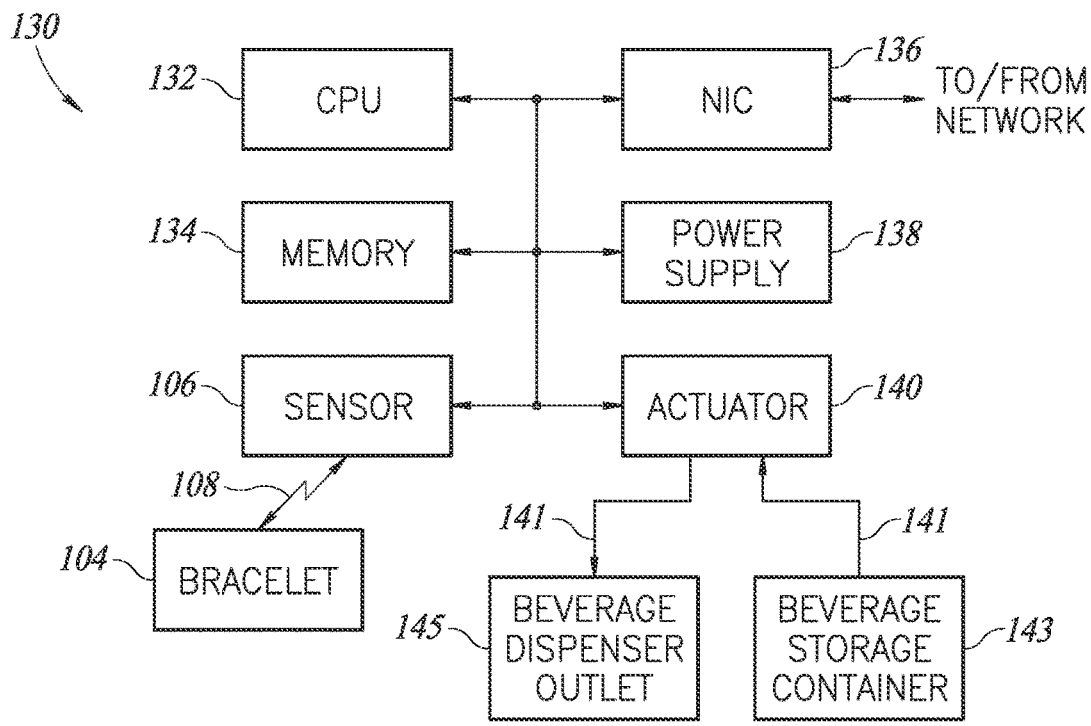
FIG. 3 is a functional block diagram of a beverage dispenser constructed in accordance with the present disclosure.

For the sake of simplicity, FIG. 1 illustrates the sensor 106 in direct communication with the bracelet 104 and in communication with the payment server 112 via the network 102. However, in a typical implementation, the sensor 106 may be part of a beverage dispenser 130. FIG. 3 is a functional block diagram of the beverage dispenser 130.

The dispenser 130 includes a CPU 132 and a memory 134. In general, the CPU 132 executes instructions using data and instructions stored in the memory 134. As with the CPU 116 in the bracelet 104, the CPU 132 may be implemented as a conventional processor, microcontroller, application specific integrated circuit (ASIC), or the like. Similarly, the memory 134 may include random access memory, read-only memory, flash memory, and the like. Those skilled in the art will appreciate that the CPU 132 and memory 134 may be integrated into a single device. The dispenser 130 is not limited by the specific hardware used to implement the CPU 132 and memory 134.

The dispenser 130 also includes a network interface controller (NIC) 136 to control communications with the network 102 (see FIG. 1). As discussed above, the NIC 136 may be in the form of a wireless connection, such as WiFi. The NIC 136 may also be implemented for wired communication link, such as an Ethernet connection. FIG. 3 also illustrates a power supply 138 to provide power to the dispenser 130.

Finally, FIG. 3 illustrates an actuator 140, which is activated to permit dispensing of the beverage. The actuator 140 may be a solenoid or other type of valve that is electronically or pneumatically controlled, for example. The actuator 140 is positioned in the plumbing 141 between a beverage storage container 143 and a beverage dispenser output 145, such as a beer tap. Conveniently, the actuator 140 is automatically activated when the purchase request by the user has been authorized. This does not require the services of a bartender or waitperson.

In operation, the dispenser 130 is activated when the sensor 106 detects the nearby presence of the bracelet 104. In an exemplary embodiment, the sensor 106 receives user identification data from the bracelet 104 and communicates with the payment server 112 (see FIG. 1) using the NIC 136. As briefly described above, the payment server 112 verifies the identity of the user via the bracelet identification data and determines whether there is sufficient credit on the bracelet 104 to dispense a beverage selected by the user. If there is sufficient credit, the payment server 112 sends an authorization command to the dispenser 130 to provide a drink to the user. If authorized, the dispenser 130 activates the actuator 140 to dispense the drink.

Figure 7:
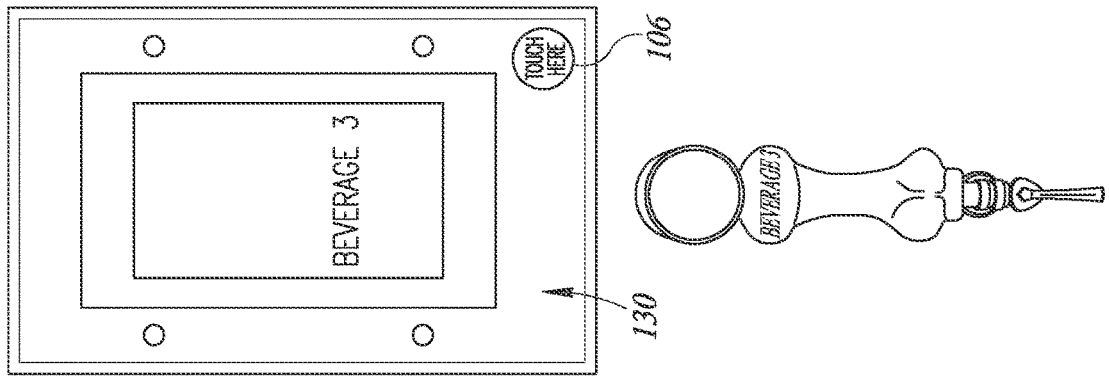
FIG. 7 illustrates one embodiment of a beverage dispensing station.
Figure 7:
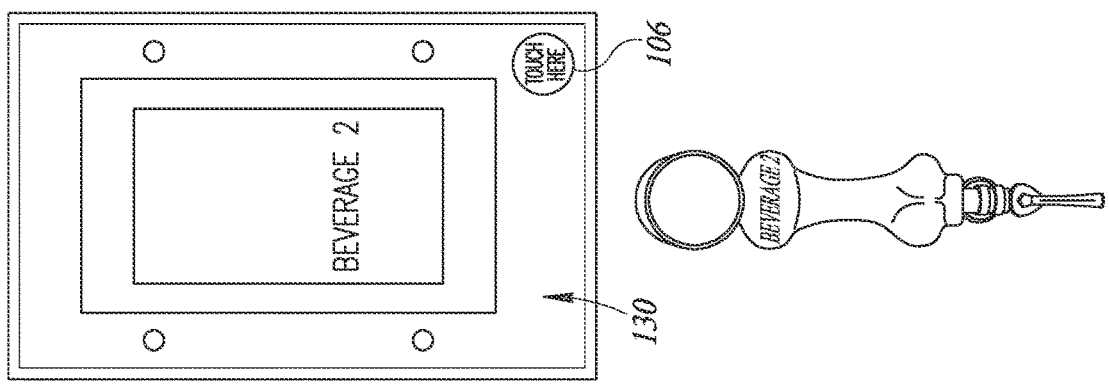
Figure 7:
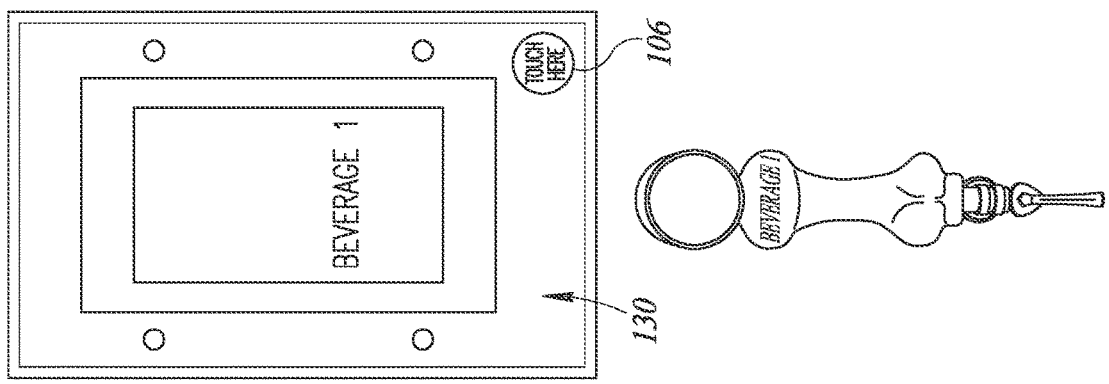

One embodiment of the beverage dispenser 130 is illustrated in FIG. 7. In FIG. 7, three beer taps are controlled by separate dispensers 130. Alternatively, some components of the dispenser 130 in FIG. 3 may be used for all three beer taps, but with a separate sensor 106 and a separate actuator 140 for each beer tap. In the embodiment of FIG. 7, each dispenser 130 has a video display that provides information about each beverage. The display may also provide price information. The user simply moves the bracelet 104 into proximity with the sensor 106 on the desired dispenser 130 to initiate a transaction.

Figure 4:
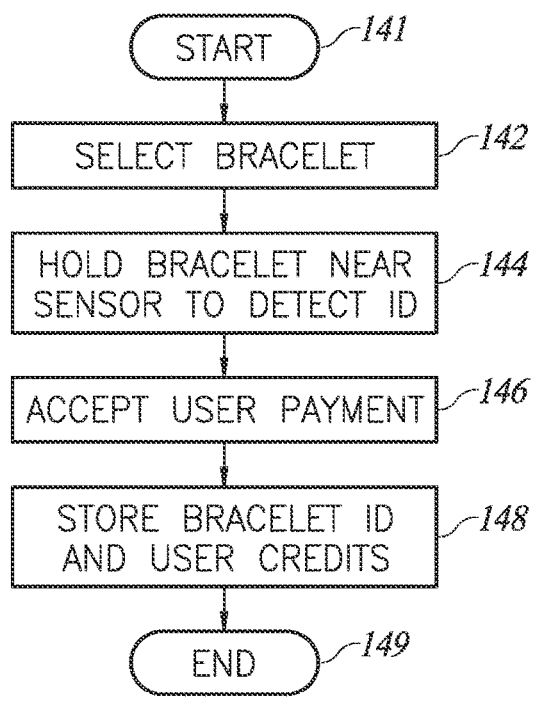
FIG. 4 is a flowchart illustrating operation of a system to create user identification and store the initial user credit value.

FIG. 4 is a flowchart illustrating operation of the system 100 to create the user identification and store the initial user credit value. At a start 141, the user enters the bar. It should be noted that acceptable form of user identification, such as a driver's license, can be used to confirm user identity and appropriate age for drinking.

At step 142 a bracelet 104 is selected. The bracelet 104 may be manufactured from a flexible rubber material to permit easy placement on the user's wrist, attached with an adjustable strap, or the like. As noted above, the bracelet 104 may also be attached with a clamping element or some other attachment mechanism to prevent the removal of the bracelet without its destruction. Prior to placement on the wrist, in step 144 the selected bracelet 104 can be held near the sensor 106 at a point of sale terminal to detect the bracelet identification.

In step 146, the bar can take any form of user payment acceptable for the drinks, such as cash, credit/debit card, and the like. In step 148 the bracelet identification data and user credit data is stored in the payment server 112 and the process ends at 149.

Figure 5:
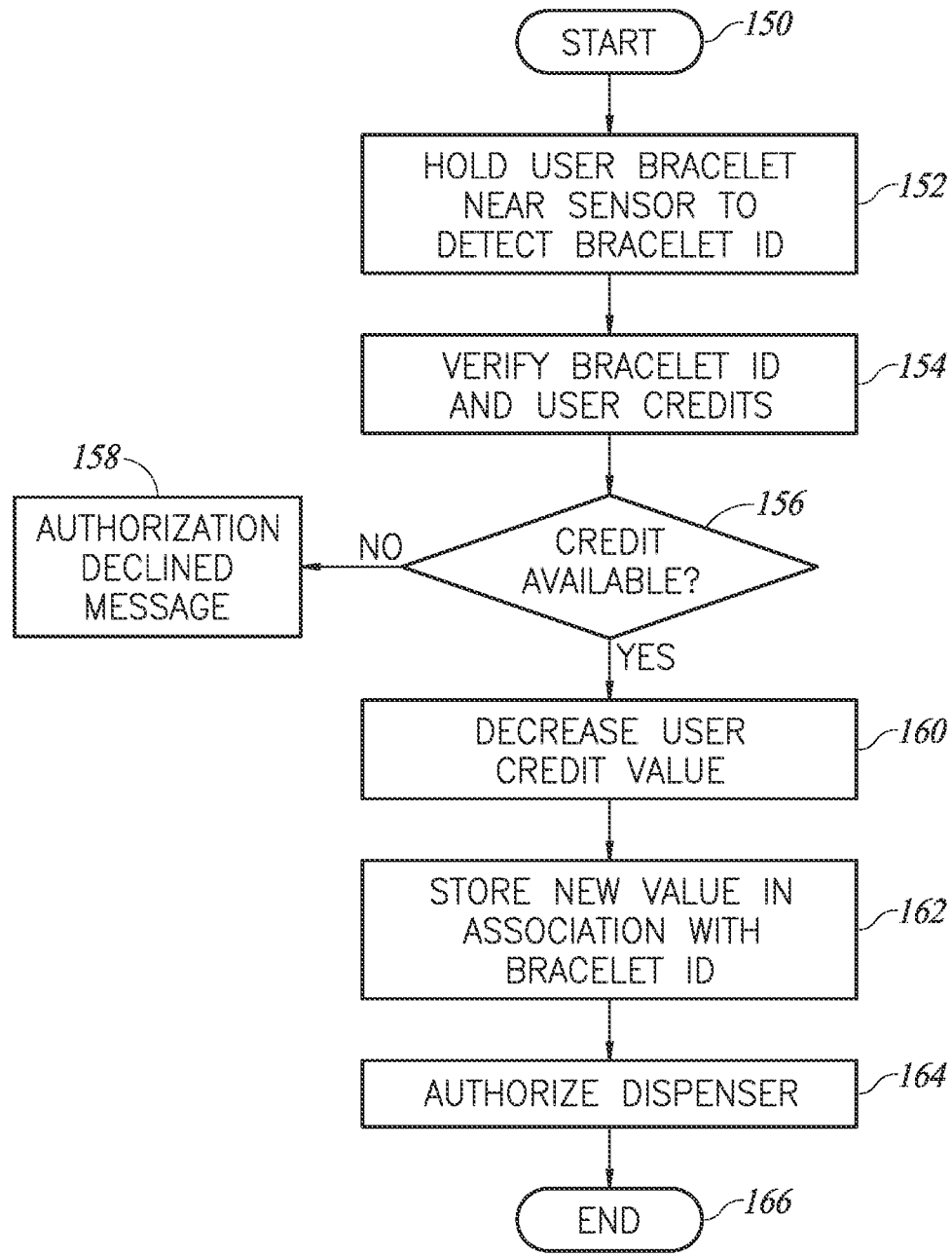
FIG. 5 is a flowchart illustrating operation of the system to check the user credit value and to decrease the user credit value for each drink fill/refill.

FIG. 5 is a flowchart illustrating operation of the system 100 to check the user credit value and to decrease the user credit value for each drink fill/refill. At a start 150, the bracelet identification data and initial user credit value has been established and stored in the payment server 112. In step 152, the user holds the bracelet 104 near the sensor 106 to permit detection of the bracelet identification data. The bracelet identification data is sent to the payment server 112 via the network 102. The payment server 112 uses the bracelet identification data and verifies the bracelet identification and user credit value in step 154.

In decision 156, the system 100 determines if there is sufficient credit available to dispense a drink. If no remaining user credits, or insufficient credits, are available, the result of decision 156 is NO and the payment server 112 will not send an authorization command to the dispenser 130 and the actuator 140 will not be activated to dispense a drink. In one embodiment, the payment server 112 can send an authorization declined message to the dispenser 130 and/or the user, in step 158.

If sufficient credits are available to dispense a drink, the result of decision 156 is YES, and in step 160 the payment server 112 decreases the user credit value to reflect the new purchase. In step 162, the payment server 112 stores the decreased credit value in association with the bracelet identification data.

In step 164, the payment server 112 sends an authorization command to the dispenser 130 to indicate that the user has sufficient credit for a drink or refill. As described above, the actuator 140 is activated to permit the user to refill his glass and the process ends at 166.

Those skilled in the art will appreciate that the process sequence in FIG. 5 can be altered without adversely affecting operation of the dispenser 130. For example, the execution of steps 160-162 to decrease the credit value and store the new credit value can occur after authorizing the dispenser in step 164. Although not illustrated in FIG. 5, the user can cancel the purchase at any time before the actual dispensing of the beverage. For example, the user may change their mind and switch from one beverage to another. Thus, the system 100 may also provide a mechanism to refund credit value for the canceled purchase. Alternatively, steps 160-162 may be executed only after the beverage has been dispensed.

Thus, the system 100 tracks the purchase and controls the dispensing of drinks. Although the examples provided herein relate to alcohol purchases, the principles of the system 100 can be applied more broadly to other embodiments. For example, the bracelet 104 may be used in an amusement park to control the purchase of beverages, snacks, souvenirs, activities, and even park admission in a self-service manner. The users(s) each receive a bracelet 104 and a credit value is assigned to each bracelet 104 at the ticket window for the amusement park.

In one embodiment, all of the bracelets 104 in a single group, such as a family, may be tied to a single group account so that a purchase using any of the bracelets in the group will result in a deduction from the group account. For example, a family of four can visit an amusement park, or any attraction, and receive four bracelets 104. One person can provide a credit/debit card to add a credit value that is associated with all four bracelets. In this embodiment, there is a single account and credit level that is decreased by a purchase using any of the four bracelets. The use of a group account can be applied to any of the embodiments of the system 100 described herein.

The distribution of beverages can be accomplished in the manner described above. For snack or beverage dispensing, the bracelet 104 can be positioned near the sensor 106 of a snack dispensing machine and a product selected by the user. If sufficient credits are available, the actuator 140 for the selected product is activated and the snack dispensed. Similarly, purchases, such as food, beverages and souvenirs can be purchased with the bracelet 104 by bringing the bracelet 104 into proximity with the sensor 106 at a check-out area or point of sales terminal. The purchase amount is decreased from the stored value associated with the bracelet 104 in the manner described above.

In another embodiment, the bracelet 104 can be used in a resort setting for identification throughout the resort as well as for purchases of goods and services as described above. One skilled in the art will appreciate that services are not "dispensed" the manner described with respect to food or beverages. However, a token or some other physical or electronic form of payment for the services can be used to indicate that some form of services has been purchased.

The system 100 also permits group accounts so that a group of bracelets 104 can be associated with a single account, as described above. The bracelet 104 can be used in the manner described above for purchases of food, beverages, souvenirs, activities, and the like. In addition, the bracelet 104 can be used to access certain areas, such as a pool, or the individual hotel room(s). In addition to storing credit values in association with the bracelet 104, the system 100 can store calendar data as well. For example, if an individual or group is scheduled to check out of the resort on a Wednesday, the system 100 can store data that deactivates the bracelet 104 after the actual checkout or after the appointed check out time for the resort. In this embodiment, the data associated with the bracelet 104 can include calendar data in addition to credit data and user identification data. Advantageously, the system 100 does not store actual user financial data, such as a credit card number, on the bracelet 104 or on the payment server 112 (see FIG. 1) in association with the bracelet. In this way, the interception of data on the communication link 108 does not compromise customer financial data.

In other embodiments for beverage purchases, the functions of the payment server 112 may be incorporated into the dispenser 130. If the credit values are stored in the bracelet 104, the dispenser can adjust the credit value accordingly and store the adjusted credit value in the bracelet 104 as described above. This may eliminate the need for the network 102 and much of the network communication components described above. Other variations are considered to be within the scope of the system 100.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system for payment tracking of alcohol purchases, the system comprising:
    a plurality of wearable devices, wherein
        each wearable device of the plurality of wearable devices comprises an electronic identification element of a plurality of electronic identification elements, and
        each electronic identification element of the plurality of electronic identification elements indicates association of each user of a plurality of users with a corresponding wearable device of the plurality of wearable devices;
    a sensor configured to sense each wearable device of the plurality of wearable devices to receive identification data from a corresponding electronic identification element of the plurality of electronic identification elements;
    an electronic data storage element configured to store a current financial credit value stored in association with the identification data; and
    a payment processor communicatively coupled to the sensor and configured to associate each electronic identification element of the plurality of electronic identification elements for the plurality of wearable devices, as a group that includes the plurality of users, with the electronic data storage element to accept payments from each identified user of the plurality of users of the group; and to store payment data as an initial financial credit value for the group in the electronic data storage element,
    the payment processor is further configured to accept a first payment request, having a payment request value, from a first identified user of the plurality of users of the group for an alcohol purchase, the payment processor responding to the first payment request by determining whether the first payment request does not exceed the initial financial credit value for the group, and deducting the payment request value from the initial financial credit value for the group when the first payment request does not exceed the initial financial credit value for the group, deducting the payment request value from the initial financial credit value for the group to thereby generate the current financial credit value for the group, and authorizing the alcohol purchase, the payment processor rejecting the alcohol purchase when the first payment request is greater than the initial financial credit value for the group,
    wherein each wearable device is attached to a wrist of the associated user of the plurality of users in a manner that does not permit removal without destruction of the wearable device to thereby prevent one user from handing off the wearable device to another user,
    wherein the electronic data storage element receives and stores the current financial credit value for the group following authorization of the alcohol purchase,
    wherein the payment processor is further configured to accept a subsequent payment request, having a subsequent payment request value, from a second identified user using a second wearable device of the plurality of wearable devices of the group for an alcohol purchase, the payment processor responding to the subsequent payment request by determining whether the subsequent payment request does not exceed the current financial credit value for the group, and deducting the subsequent payment request value from the current financial credit value for the group when the subsequent payment request does not exceed the current financial credit value for the group, deducting the subsequent payment request value from the current financial credit value for the group to thereby generate a new current financial credit value for the group, and authorizing the alcohol purchase, the payment processor rejecting the purchase of the alcohol when the subsequent payment request exceeds the current financial credit value for the group.

2. The system of claim 1, further comprising an actuator positioned between an alcohol storage container and an alcohol distribution outlet, wherein authorizing the alcohol purchase comprises automatically activating the actuator.

3. The system of claim 1, wherein the electronic data storage element is contained within each wearable device of the plurality of wearable devices.

4. The system of claim 1, further comprising a payment server, wherein the payment server includes the electronic data storage element.

5. The system of claim 1, further comprising a payment server, wherein the sensor is located in a first location and the payment server is in a location remote from the first location, the payment server is communicatively coupled to the sensor via a computer network, and the payment server includes the payment processor.

6. The system of claim 1, wherein the financial credit value is a monetary value.

7. The system of claim 1, further comprising a short-range transceiver coupled to a bracelet for communication with the sensor.

8. The system of claim 7, wherein the short-range transceiver is a Zigbee compatible transceiver.

9. The system of claim 7, wherein the short-range transceiver is a near-field communication (NFC) compatible transceiver.

10. The system of claim 1 each wearable device is attached to a wrist of the associated user of the plurality of users following verification that each of the plurality of users is legally eligible to purchase alcoholic beverages.

11. A system for payment tracking of alcohol purchases, the system comprising:

a plurality of wearable devices, wherein each wearable device of the plurality of wearable devices comprises an electronic identification element of a plurality of electronic identification elements, each electronic identification element of the plurality of electronic identification elements indicates association of each user of a plurality of users with a corresponding wearable device of the plurality of wearable devices, each wearable device being attached to a wrist of each respective one of the associated users following verification that each respective one of the associated users is legally eligible to purchase alcoholic beverages, and each of the plurality of wearable devices being attached to a wrist of each respective one of the associated users in a manner that does not permit removal of the wearable device without destruction of the wearable device to thereby prevent one user from handing off the wearable device to another user;

an electronically controlled beverage dispenser in communication with a beverage storage container and a beverage outlet;

an electronically controlled actuator positioned between the beverage storage container and the beverage outlet that, when activated, permits the passage of the beverage from the beverage storage container to the beverage outlet;

a sensor coupled to the electronically controlled beverage dispenser and configured to sense each wearable device of the plurality of wearable devices to receive identification data from a corresponding electronic identification element of the plurality of electronic elements;

an electronic data storage element configured to store a current financial credit value stored in association with the identification data; and a payment processor configured to associate the electronic identification element of the plurality of electronic identification elements for the plurality of wearable devices, as a group that includes the plurality of users, with the electronic data storage element to accept payments from each identified user of the plurality of users of the group; and to store payment data as an initial financial credit value for the group in the electronic data storage element, to accept a plurality of payment requests initiated by the sensor detecting the plurality of wearable devices in proximity of the sensor, each payment request of the plurality of payment requests having a payment request value, wherein the payment processor is further configured to electronically deduct the payment request value for any of the group from the current financial credit value for the group in response to the payment processor authorizing the alcohol purchase to thereby generate a new credit value; and to store the new credit value as the current financial credit value for the group in association with the identification data from the plurality of wearable devices, the payment processor authorizing the alcohol purchase when each payment request of the plurality of payment requests does not exceed the current financial credit value for the group and rejecting the alcohol purchase for any payment request of the plurality of payment requests that exceeds the current financial credit value for the group, the electronically controlled actuator being activated, in response to the payment processor authorizing the alcohol purchase, to permit dispensing of the purchased alcohol.

12. The system of claim 11, wherein the electronic data storage element is contained within each wearable device of the plurality of wearable devices.

13. The system of claim 11, wherein the payment server includes the electronic data storage element.

14. The system of claim 11, wherein the electronically controlled beverage dispenser is located in a first location and the payment server is in a location remote from the first location, the payment server is communicatively coupled to the electronically controlled beverage dispenser via a computer network.

15. A system for payment tracking of purchases, the system comprising:

a plurality of wearable devices, wherein each wearable device of the plurality of wearable devices comprises an electronic identification element of a plurality of electronic identification elements, and each electronic identification element of the plurality of electronic identification elements indicates association of each user of a plurality of users with a corresponding wearable device of the plurality of wearable devices, wherein each wearable device is attached to a wrist of the associated user of the plurality of users in a manner that does not permit removal without destruction of the wearable device to thereby prevent one user from handing off the wearable device to another user;

an electronically controlled dispenser in electronic communication with a storage container storing items for purchase and an outlet from which the items are dispensed;

an electronically controlled actuator positioned between the storage container and the outlet that, when activated, permits the passage of a purchased item from the storage container to the outlet;

a sensor coupled to the electronically controlled dispenser and configured to sense each wearable device of the plurality of wearable devices to receive identification data from a corresponding electronic identification element of the plurality of identification elements;

an electronic data storage element configured to store a current financial credit value stored in association with the identification data; and a payment processor configured to associate each electronic identification element of the plurality of electronic identification elements for the plurality of wearable devices, as a group that includes the plurality of users, with the electronic data storage element, to accept payments from each identified user of a plurality of users of the group; and to store payment data as an initial financial credit value for the group in the electronic data storage element, to accept a plurality of payment requests initiated by the sensor detecting the plurality of wearable devices in proximity of the sensor, each payment request of the plurality of payment requests having a payment request value, the payment processor authorizing the purchase when each payment request of the plurality of payment requests does not exceed the current financial credit value for the group and rejecting the purchase for any payment request of the plurality of payment requests that exceeds the current financial credit value for the group, the electronically controlled actuator being activated, in response to the payment processor authorizing the purchase, to permit dispensing of the purchased item, wherein the payment processor is further configured to electronically deduct the payment request value from the current financial credit value for the group in response to the payment processor authorizing the purchase to thereby generate a new credit value; and to store the new credit value as the current financial credit value for the group in association with the identification data from the plurality of wearable devices.

16. The system of claim 15, wherein the purchased item is a food item.

17. The system of claim 15, wherein the purchased item is a beverage.

18. The system of claim 15, wherein the purchased item is an article of clothing.

19. The system of claim 15, wherein the purchased item is a provided service.

20. A method for payment tracking of beverage purchases, the method comprising:

selecting a plurality of wearable devices, wherein each wearable device of the plurality of wearable devices includes electronic identification data;

associating the plurality of wearable devices, as a group, with a plurality of users;

verifying that each of the plurality of users is legally eligible to purchase alcoholic beverages;

attaching one of the plurality of wearable devices to a wrist of each of the associated users in a manner that does not permit removal of the wearable device without destruction of the wearable device to thereby prevent one user from handing off the wearable device to another user;

storing, in an electronic data storage element, a current financial credit value for the group in association with the identification data from the plurality of wearable devices;

sensing the plurality of wearable devices in proximity with a sensor coupled to a beverage dispenser;

initiating a plurality of payment requests when the plurality of wearable devices of the group, is moved into proximity with the sensor, each payment request of the plurality of payment requests having a payment request value;

receiving, by the beverage dispenser, the identification data when the plurality of wearable devices is moved into proximity with the sensor;

authorizing, by a payment processor, the beverage purchase for each payment request that does not exceed the current financial credit value for the group and rejecting the beverage purchase for any payment request that exceeds the current financial credit value for the group;

activating an actuator positioned between a beverage storage container and a beverage outlet in response to the payment processor authorizing the beverage purchase;

electronically deducting the payment request value from the current financial credit value for the group in response to the payment processor authorizing the beverage purchase to thereby generate a new credit value; and storing the new credit value as the current financial credit value for the group in association with the identification data from the plurality of wearable devices.

21. The method of claim 20, wherein storing the current financial credit value and the new financial credit value for the group comprises storing financial credit values in the electronic data storage element contained within each wearable device of the plurality of wearable devices.

22. The method of claim 20, wherein storing the current financial credit value and the new financial credit value for the group comprises storing financial credit values in an electronic data storage element contained within the payment processor.

23. The method of claim 20, wherein the payment processor is in electronic communication with the beverage dispenser, and the beverage dispenser receives the identification data from the payment processor when the plurality of wearable devices is moved into proximity with the sensor.

24. The method of claim 23, wherein the beverage dispenser is located in a first location, the payment processor is in a location remote from the first location, and the payment processor is in electronic communication with the beverage dispenser via a computer network.

25. The method of claim 20, wherein the identification data is received using a short-range transceiver coupled to each wearable device of the plurality of wearable devices for wirelessly communicating between each wearable device of the plurality of wearable devices and the sensor.

26. The method of claim 25, wherein the short-range transceiver is a Zigbee compatible transceiver.

27. The method of claim 25, wherein the short-range transceiver is a near-field communication (NFC) compatible transceiver.

* * * * *